United States Patent
Thomas et al.

(10) Patent No.: US 6,876,097 B2
(45) Date of Patent: Apr. 5, 2005

(54) SYSTEM FOR REGULATING SPEED OF AN INTERNAL COMBUSTION ENGINE

(75) Inventors: Robert J. Thomas, Indianapolis, IN (US); Terry M VandenBerghe, Columbus, IN (US); Matthew S. Carroll, Nashville, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 10/081,851

(22) Filed: Feb. 22, 2002

(65) Prior Publication Data

US 2002/0113439 A1 Aug. 22, 2002

Related U.S. Application Data

(60) Provisional application No. 60/270,570, filed on Feb. 22, 2001.

(51) Int. Cl.[7] ............................................. F03B 13/12
(52) U.S. Cl. ................. 290/40 A; 290/40 R; 290/40 C
(58) Field of Search ............................ 290/40 A, 40 R, 290/40 C

(56) References Cited

U.S. PATENT DOCUMENTS

| | | | |
|---|---|---|---|
| 2,067,288 A | 1/1937 | Riehm | |
| 3,618,313 A | 11/1971 | Gottlieb | |
| 4,502,282 A | 3/1985 | Kanesaka | |

(Continued)

FOREIGN PATENT DOCUMENTS

| | | |
|---|---|---|
| DE | 35 39 578 A1 | 8/1985 |
| DE | 34 21 775 A1 | 12/1985 |
| DE | 35 39 168 A1 | 7/1986 |
| DE | 37 14 192 A1 | 11/1988 |
| EP | 0 134 373 A1 | 7/1983 |
| JP | 03 145530 A | 6/1991 |
| JP | 05 044519 A | 2/1993 |
| JP | 05 171965 A | 9/1993 |

OTHER PUBLICATIONS

Yves Baguelin, "*Diesel Piston Engine Providing a Controlled Air Compressor Function,*" Mar. 20, 1985. Purported English Translation for European Patent No. EP 0 134 373 A1.

Piech, Ferdinand, "*Operating turbocharged spark ignition motor vehicle engine by programmed omission of ignitions at idling and low load to introduce unbarnt fuel in exhaust lines,*" Derwent Publications Ltd, England, 1985. Purported English Abstract for German Patent No. DE 34 21 775 A1.

Giesen, Klaus, "*Driving procedure for turbocharged IC engine controlling response to increased demand by regular adjusting transient engine condition to increase exhaust gas power,*" Derwent Publications Ltd, England, 1985. Purported English Abstract for German Patent No. DE 35 39 168 A1.

Greiner, Max, "*Exhaust turbocharger for vehicle IC engine adjusts ignition timing or opening of engine outlet valves to improve acceleration at high revolutions,*" Derwent Publications Ltd, 1988. Purported English Abstract for German Patent No. DE 37 14 192 A1.

(Continued)

Primary Examiner—Nicholas Ponomarenko
Assistant Examiner—Iraj A. Mohandesi
(74) Attorney, Agent, or Firm—Woodard, Emhardt, Moriarty, McNett & Henry LLP

(57) ABSTRACT

An internal combustion engine system is disclosed that improves regulation of engine speed relative to a speed setpoint. The system controls ignition timing, throttle plate actuation, fuel valve actuation or a combination thereof in accordance with maintaining a setpoint speed. The system also includes a transient air flow estimation for further improving setpoint speed accuracy.

44 Claims, 8 Drawing Sheets

U.S. PATENT DOCUMENTS

| | | | |
|---|---|---|---|
| 4,641,613 A | 2/1987 | Delesalle | |
| 4,665,704 A | 5/1987 | Hartwig | |
| 4,742,681 A | 5/1988 | Haberkern et al. | |
| 4,867,127 A | 9/1989 | Quirchmayr et al. | |
| 4,958,497 A | 9/1990 | Kawamura | |
| 4,961,406 A | 10/1990 | Burandt | |
| 5,218,945 A | 6/1993 | Kapellen et al. | |
| 5,377,631 A | 1/1995 | Schechter | |
| 5,390,491 A | 2/1995 | Suzumura et al. | |
| 5,450,828 A | 9/1995 | Sakamoto et al. | |
| 5,477,830 A | 12/1995 | Beck et al. | |
| 5,479,898 A | 1/1996 | Cullen et al. | |
| 5,481,461 A | 1/1996 | Miyamoto et al. | |
| 5,492,094 A | 2/1996 | Cullen et al. | |
| 5,501,073 A | 3/1996 | Miyashita et al. | |
| 5,533,492 A | 7/1996 | Willey et al. | |
| 5,553,575 A | 9/1996 | Beck et al. | |
| 5,572,970 A | 11/1996 | Fukumura | |
| 5,575,266 A | 11/1996 | Iida | |
| 5,622,053 A | 4/1997 | Freen | |
| 5,713,340 A | 2/1998 | Vandenberghe et al. | |
| 5,738,070 A | 4/1998 | Donaldson et al. | |
| 5,949,146 A | 9/1999 | VandenBerghe | |
| 5,996,552 A | 12/1999 | Iijima et al. | |
| 6,291,903 B1 * | 9/2001 | Horibe | 290/40 |
| 6,414,400 B1 * | 7/2002 | Scott et al. | |

OTHER PUBLICATIONS

Hiroshi Matsuoka, "*Device for Increasing the Electric Power Generation Rate in idle Mode,*" Japan, Jun. 20, 1991. Purported English Translation for Japanese Patent No. JP 03 145530 A.

Miyamoto Katsuhiko, "*Control Method for Variable Cylinder Engine,*" Japan, Sep. 7, 1993. Purported English Abstract for Japanese Patent No. JP 05 171965 A.

Kazuhiro Nakai, "*Variable Rotation Prevention Device for an Internal Combustion Engine,*" Japan, Feb. 23, 1993. Purported English Translation for Japanese Patent No. JP 05 044519 A.

Ferdinand Piech, "*Applied Ignition, Multicylinder Internal–Combustion Engine with Exhaust Gas Turbocharging,*" Germany, Dec. 8, 1994. Purported English Translation for German Patent No. DE 35 39 578 A1.

JPO & Japio Abstract, "*Diesel Generator for Emergency*", Hitachi Ltd., Publication No. 63170531, Jul. 14, 1988.

JPO & Japio Abstract, "*Turbo Charger With Rotary Electric Machine*", Isuzu Motors Ltd., Publication No. 01170721, Jul. 5, 1989.

JPO & Japio Abstract, "*Torque–Down Controller By Means of Compound Device*", Nissan Motor Co. Ltd., Publication No. 05001593, Jan. 8, 1993.

JPO & Japio Abstract, "*Fuel Injection Device for Engine Provided with Supercharger, and Control Method Thereof*", Komatsu Ltd., Publication No. 10288057, Oct. 27, 1998.

Peter V. Woon, Axel O. Zur Loye, Larry J. Brackney, Jay F. Leonard, Eric K. Bradley, Terry M. VandenBerghe, Jacqueline M. Mudd, Julie A. Wagner and Greg A. Moore, "*Operating Techniques for Internal Combustion Engines,*" U.S. Appl. No. 09/487,526, filed Jan. 19, 2000.

* cited by examiner

US 6,876,097 B2

SYSTEM FOR REGULATING SPEED OF AN INTERNAL COMBUSTION ENGINE

CROSS-REFERENCE TO RELATED APPLICATIONS

The present application claims the benefit of U.S. Provisional Application No. 60/270,570 filed Feb. 22, 2001, which is hereby incorporated by reference in its entirety.

BACKGROUND

The present invention relates to internal combustion engines, and more particularly, but not exclusively, is directed to operating techniques for a turbocharged internal combustion engine driving an electrical power generator.

In certain applications it is generally desirable to control rotational speed of an internal combustion engine. This is particularly true in applications where the engine is a prime mover for an electrical power generator. Often, proper performance of electrical equipment being powered by such a generator requires that alternating current (AC) be provided at a generally constant frequency, despite changes in generator load, operating conditions of the engine, etc.

Previous attempts have typically utilized one particular engine control subsystem, such as throttle control, to maintain engine speed at a desired speed setpoint, while simultaneous utilizing other control subsystems to optimize different parameters. However, such systems still allow engine speed variations that may be unacceptable for certain applications. Thus there is a need for a technique that more accurately regulates engine speed. Also it would be particularly advantageous if this need could be met using an engine capable of operation with a gaseous fuel because of its ready availability in many locations that require a back-up power generation system and its potential to be less adverse to the environment compared to other fuel types. Moreover, other internal combustion engine applications would benefit from better techniques for regulating engine speed. The present invention meets these needs and provides other benefits and advantages.

SUMMARY

One form of the present invention is a unique internal combustion engine system. Another form of the present invention includes a unique technique for adjusting air/fuel ratio (lambda) to regulate engine speed. These and other forms may also include active spark timing, throttle control, and/or transient air mass flow estimation to further improve speed regulation.

A further form of the present invention includes an electric generator driven by an engine, a sensor to sense engine speed, and a control apparatus operative to control air/fuel ratio to substantially maintain a target engine speed. Other sensors and apparatus to control throttle plate actuation, spark ignition timing, transient airflow estimation, or a combination thereof can also be included.

Still another form of the present invention comprises operating an internal combustion engine and adjusting a fuel/air ratio in response to a detected rotational speed of the engine.

One object of the present invention is to provide a unique internal combustion engine system.

Another object of the present invention is to provide a unique engine control system, method, device, or apparatus.

Further forms, embodiments, features, objects, advantages, benefits, and aspects of the present invention shall become apparent from the detailed description and drawings provided herein.

DETAILED DESCRIPTION OF SELECTED EMBODIMENTS

Figure 1:
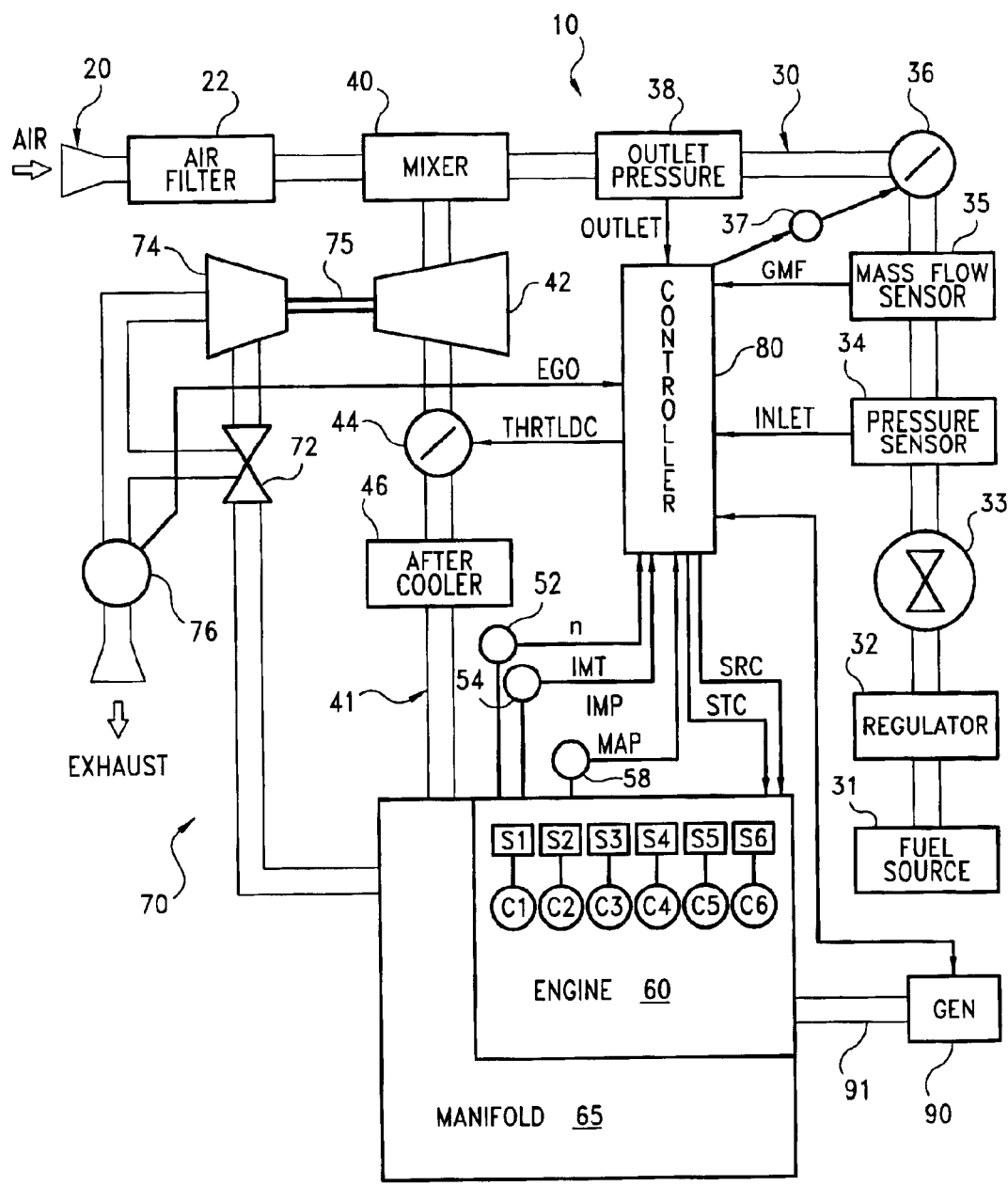
FIG. 1 is a schematic view of an electrical power generation system.

For the purposes of promoting an understanding of the principles of the invention, reference will now be made to the form illustrated in the drawings and specific language will be used to describe the same. It will nevertheless be understood that no limitation of the scope of the invention is thereby intended. Any alterations and further modifications in the described or illustrated embodiments, or further applications of the principles of the inventions contained herein are contemplated as would normally occur to one skilled in the art to which the invention relates.

FIG. 1 illustrates an electrical generation system 10 of one form of the present invention. System 10 includes engine 60 operable to drive electric power generator 90 through mechanical linkage 91. Linkage 91 can include one or more drive shafts, gears, clutches, drive chains or belts, and the like suitable to provide mechanical power to generator 90 with engine 60. Controller 80 of system 10 is operatively coupled to various components of system 10 to regulate and control operation thereof.

System 10 also includes air pathway 20 and fuel line 30 which are in fluid communication with air/fuel mixer 40. Mixer 40 mixes air from pathway 20 with fuel from line 30 to provide a fuel charge to internal combustion engine 60 for combustion. Combustion exhaust products exit engine 60 along exhaust pathway 70.

More specifically, air pathway 20 includes air filter 22 which filters air supplied to mixer 40. Fuel line 30 includes gaseous fuel source 31, which in one embodiment is a supply of natural gas. In other embodiments, a different form of gaseous fuel could be used, and/or system 10 could be adapted for fueling with gasoline, diesel fuel, or another fuel type as would occur to those skilled in the art. Fuel source 31 is in fluid communication with pressure regulator 32 which regulates pressure of fuel flowing therethrough. Fuel flows along fuel line 30 through an emergency shut-off valve 33 to fuel inlet pressure sensor 34. Fuel inlet pressure sensor 34 supplies an inlet pressure signal INLET to controller 80 corresponding to fuel flow through fuel line 30 prior to fuel control valve 36. Flow sensor 35 provides signal GMF to controller 80 indicative of gas mass flow through line 30. Sensor 35 may be of the hot wire anemometer type, or a different type known to those skilled in the art.

Fuel flows along fuel line 30 to fuel control valve 36. Controller 80 selectively provides an adjustment signal to valve actuator 37 to correspondingly regulate the flow of fuel through fuel control valve 36 to outlet pressure sensor 38 and subsequently to mixer 40. In one form, fuel control valve 36 is a poppet-type valve linearly actuated by electromagnetic means in proportion to the pulse width of a signal from controller 80 like that shown in U.S. Pat. No.

4,537,172 to Kanehara et al. which is hereby incorporated by reference. This type of fuel control valve requires a relatively high fuel pressure line. However, the present invention also contemplates using a valve 36 which does not require a high fuel line pressure, such as a butterfly-type valve. If so chosen, a butterfly-type of fuel control valve 36 is configured for controllable, rotary actuation in response to a signal from controller 80.

Outlet pressure sensor 38 supplies an outlet pressure signal OUTLET to controller 80 corresponding to fuel flow through fuel line 30 subsequent to fuel control valve 36. Fuel flows along fuel line 30 to mixer 40, which mixes the fuel with air from air pathway 20. The air/fuel mixture (also described herein as the "mixture" or "charge") is passed to compressor 42, which is in fluid communication with mixer 40. Compressor 42 generally increases pressure of the mixture flowing therethrough, thereby generating a pressurized mixture to flow along conduit 41. Compressor 42 may be of a standard turbo-charger configuration.

The pressurized mixture flows from compressor 42 to throttle valve 44 which regulates flow of the pressurized mixture therethrough. Throttle valve 44 may be a standard butterfly-type of valve, configured for rotary actuation. Throttle valve 44 is actuated in response to a signal from controller 80. In some forms, throttle valve 44 can also alternately or additionally be actuated in response to an operator control such as a throttle plate. The pressurized mixture flows from valve 44 to aftercooler 46 which is in fluid communication with intake manifold 65. Aftercooler 46 is of a conventional type that cools the fuel charge before it enters intake manifold 65.

Figure 2:
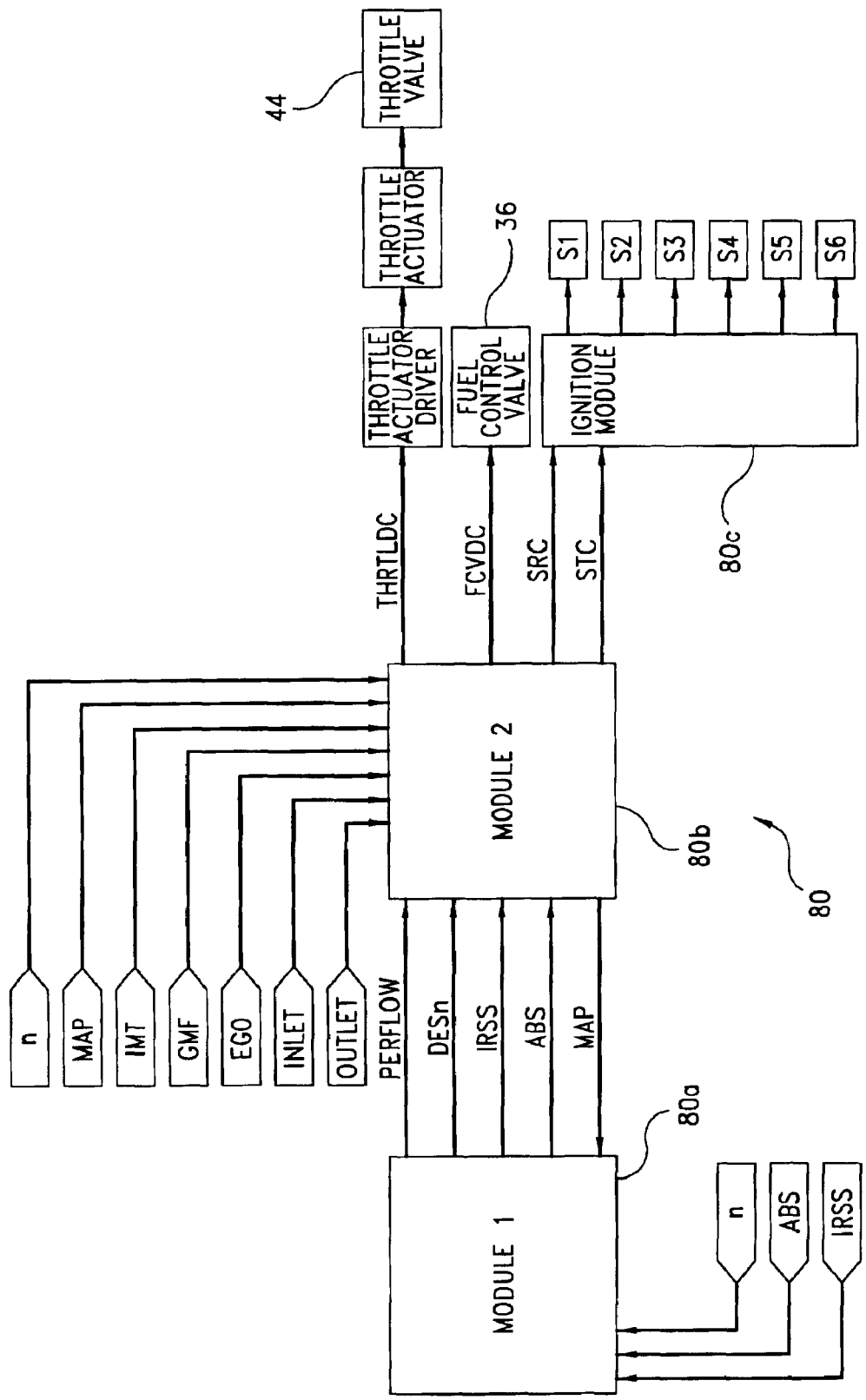
FIG. 2 is a partial schematic view of the system of FIG. 1.

Referring additionally to FIG. 2, engine 60 is of the multicycle type with combustion chambers and corresponding cylinders C1–C6 that intermittently contribute power in accordance with a timed ignition operation. Ignition is performed by activating corresponding combustion ignition devices S1–S6 in the form of spark plugs. Preferably engine 60 is of a conventional four-stroke, reciprocating piston variety. However, a rotor-based engine may be utilized instead of a reciprocating piston-based engine. In other embodiments, engine 60 has a different operating cycle, such as a two-stroke sequence. Alternately or additionally, other embodiments may utilize varying numbers and configurations of piston arrangements or other mechanical power providing members. Engine sensors 52, 54, and 58 provide signals n, IMT, and MAP, respectively. Signals n, IMT, and MAP are indicative of engine speed, intake manifold temperature, and manifold absolute pressure, respectively. Engine 60 also receives ignition control signals SRC and STC, respectively, representing a spark reference command and a spark timing command.

Combustion products from engine 60 form an exhaust stream which flows along exhaust pathway 70. Turbine 74 is oriented along pathway 70 to be driven by this exhaust stream. Pathway 70 includes wastegate 72 to selectively divert combustion products around turbine 74. As turbine 74 is turned by exhaust, mechanical linkage 75 drives compressor 42. The combustion products flowing along pathway 70 are monitored by exhaust gas oxygen sensor 76 which supplies signal EGO to controller 80 indicative of oxygen level in the exhaust gases. This exhaust gas oxygen level corresponds to the air/fuel ratio in the mixture prior to combustion. Alternately, sensor 76 may be chosen so as to measure other characteristics of the exhaust gases.

Controller 80 can be an electronic circuit comprised of one or more components. Controller 80 may be comprised of digital circuitry, analog circuitry, or both. Controller 80 may be a programmable digital or analog processor; a hardwired, dedicated state machine; or a combination of these. In one embodiment, controller 80 is a programmable microprocessor-based integrated circuit controller of known construction provided in an engine control unit. As best shown in FIG. 2, the illustrated embodiment of controller 80 includes signal processing modules 80a and 80b, and ignition control module 80c operably related to one another by various illustrated signals. In one form, modules 80a and 80b correspond to master and slave digital processing integrated circuit components, and module 80c is arranged as a signal conditioner, converting digital ignition timing inputs SRC and STC to appropriate spark activation outputs. In other embodiments, a different controller arrangement can be used with more or fewer modules as would occur to those skilled in the art.

Figure 3A:
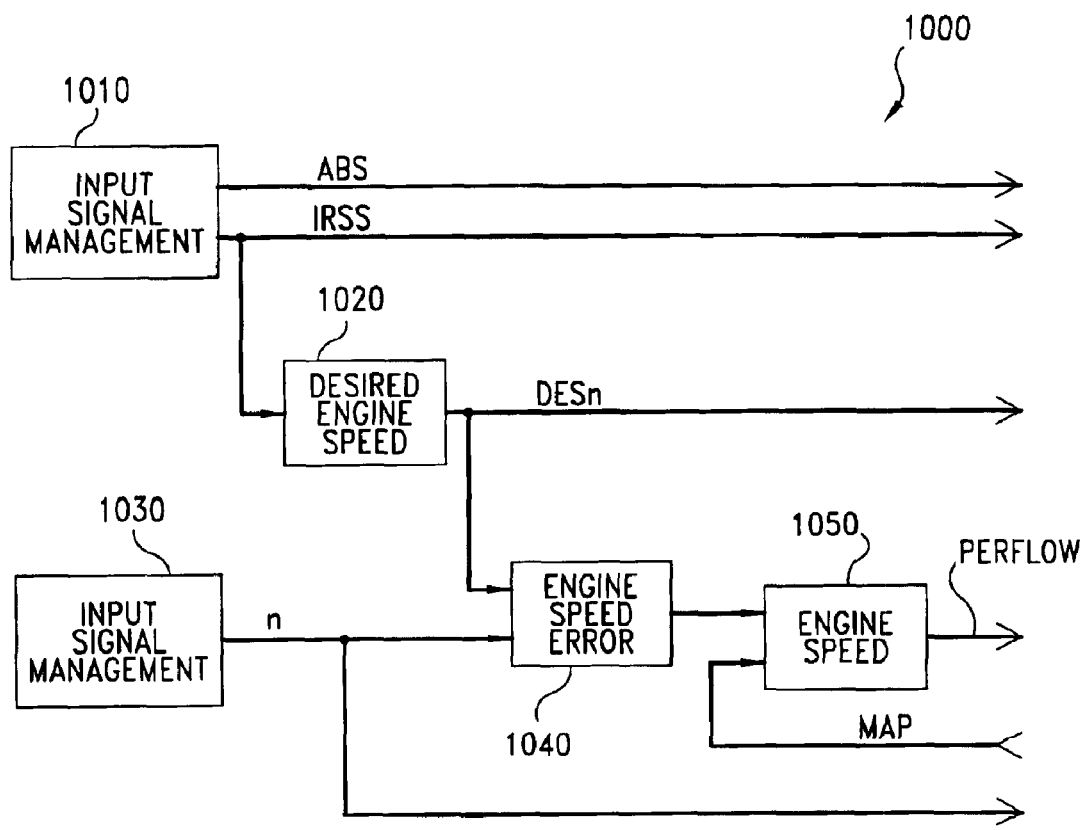
FIGS. 3A and 3B depicts a control flow diagram for the system of FIG. 1.
Figure 3B:
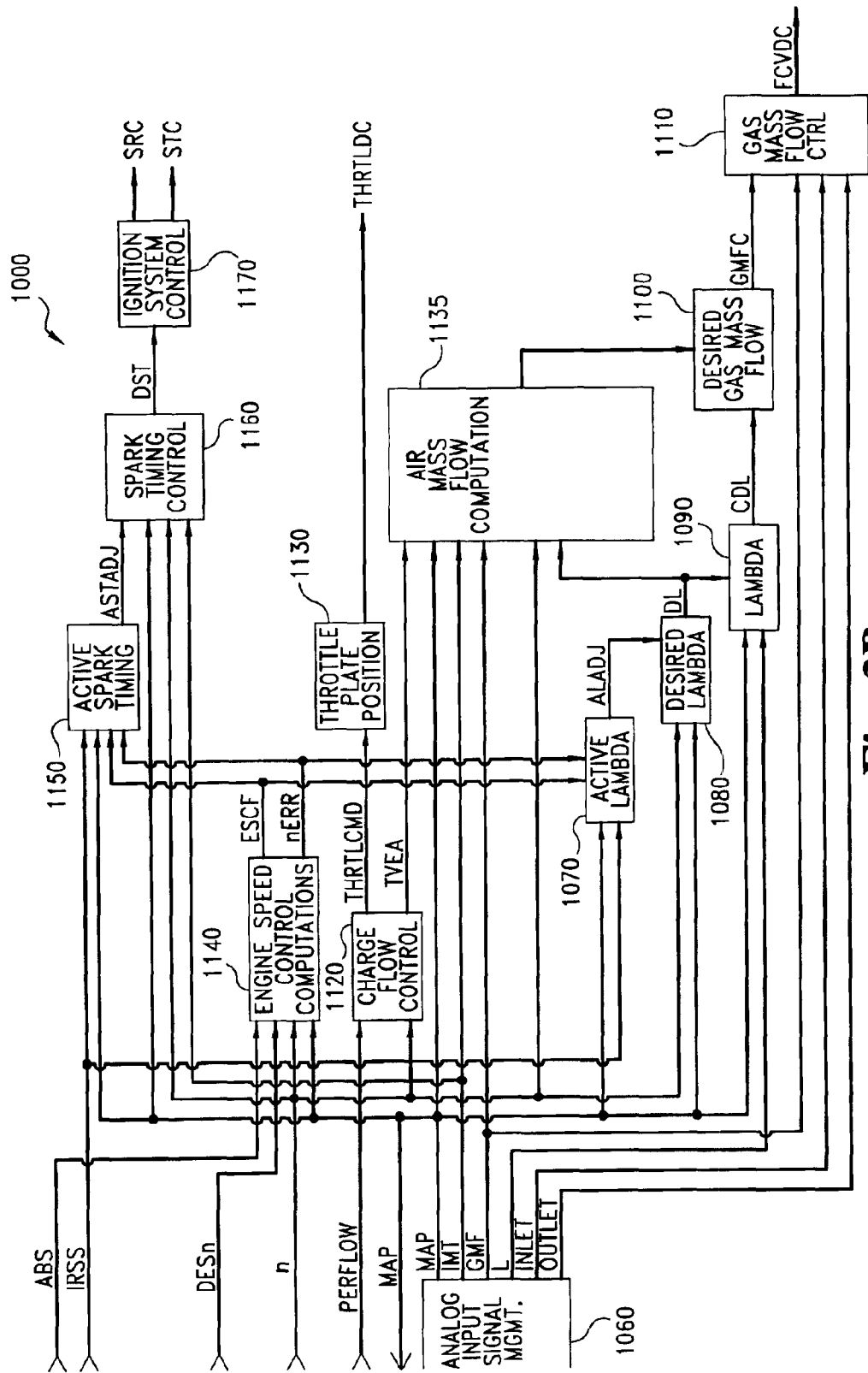

Control procedure 1000 is represented by the control flow diagram of FIGS. 3A and 3B. The various operators described in connection with procedure 1000 hereinafter are implemented with controller 80. Operator 1010 is a discrete input signal management operator which conditions hardware inputs representing alternator breaker status and idle/rated switch status, and provide corresponding signal outputs ABS and IRSS. Signal ABS is provided as an input to actual engine speed control operator 1140. Signal IRSS is provided as an input to desired engine speed computation operator 1020.

Operator 1020 outputs signal DESn representing desired engine speed. Operator 1020 implements a ramp function for increasing or decreasing the desired rotational engine speed from an idle speed setpoint to a rated speed setpoint (or vice versa), over time. The idle and rated speed setpoints may be stored in firmware, operator selected, determined from a range of pre-set or calculated values, and/or a different technique as would occur to those skilled in the art. Signal DESn is provided as an input to operators 1140 and 1040.

Operator 1030 outputs signal n representing engine speed as measured by the corresponding engine sensor. Signal n is provided as an input to engine speed error computation operator 1040 along with signal DESn from operator 1020. Signal n is also provided to various other operators illustrated in FIG. 3B. In other embodiments, signal n could be generated by an additional sensor/input signal management operator for one or more of these other operators. Operator 1040 outputs signal nERR—representing engine speed error—which may be determined by subtracting signal n (actual engine speed) from signal DESn (desired engine speed). Signal nERR is provided as an input to engine speed/flow control operator 1050.

Operator 1050 outputs signal PERFLOW representing percent fuel charge flow command which is provided as an input to charge flow control operator 1120. Operator 1050 receives as inputs, signals nERR and signal MAP. Operator 1120 outputs signals THRTLCMD and TVEA corresponding to desired throttle plate position and throttle valve effective area, respectively.

Figure 4:
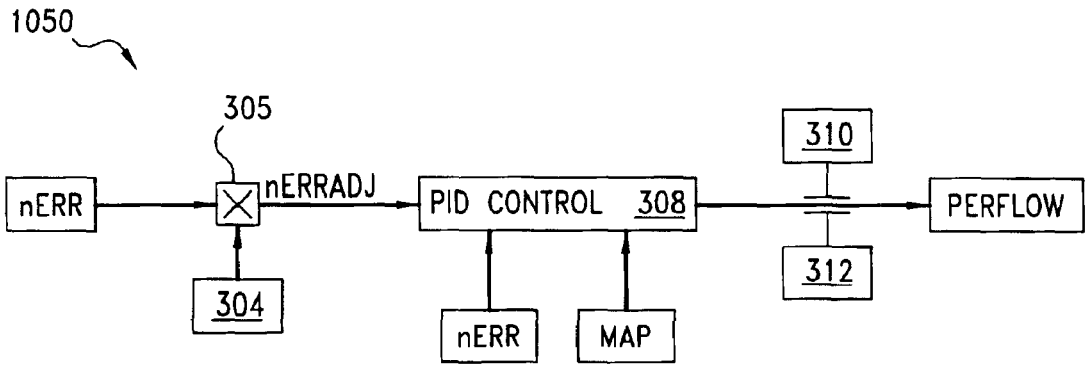
FIGS. 4–13 further depict various operators of the control flow diagram of FIGS. 3A and 3B.

FIG. 4 shows operator 1050 of FIG. 3A in greater detail. As shown in FIG. 4, signal nERR is multiplied with closed loop gain input 304 by multiplier 305. Closed loop gain input 304 is an engine speed control closed loop gain that can be a fixed preset value (for example, preprogrammed into firmware, not shown), a modifiable value (for example, a value stored in an EPROM, not shown) and/or can be calculated based on various other operational characteristics (for example, the output of a lookup table, not shown), just to name a few possibilities. The output of multiplier 305 is signal nERRADJ representing closed loop adjusted engine speed error. Signal nERRADJ is input to proportional-integral-derivative (PID) control 308 which outputs signal PERFLOW representing PID-adjusted percent fuel charge flow. Internally, PID control 308 may implement lookup tables (not shown) for determining control gains, filter time constants, or upper and lower limits used in the PID computation, with one or more parameters being determined as a function of the MAP and nERR signal inputs.

In one example, PID control 308 could internally implement three dimensional lookup tables with independent variables corresponding to engine speed and manifold absolute pressure. Such tables could have dependant outputs representing proportional gain, integral gain, derivative gain, derivative low pass filter time constant, closed loop upper limit, and closed loop lower limit. Respective proportional, integral, and derivative closed loop contribution may be determined by multiplying proportional, integral, and derivative gains by proportional integral and derivative gain multipliers respectively. Such gain multipliers could be implemented, for example, using three-dimensional lookup tables (not shown) having independent variables corresponding to engine speed error and manifold absolute pressure, and having dependant outputs representing proportional, integral, and derivative gain multipliers. Other methods as known in the art for implementing PID controls could alternately be used.

Still referring to FIG. 4, upper limit 310 and lower limit 312 may optionally be included to restrict signal PERFLOW to a range of values. Signal PERFLOW is output to charge flow control operator 1120 of FIG. 3B, an implementation of which is now described in connection with FIG. 5.

Figure 5:
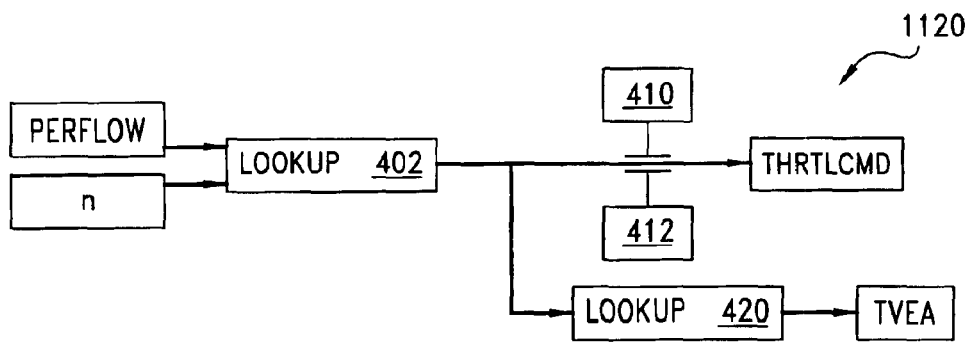

FIG. 5 shows operator 1120 of FIG. 3B in greater detail. As shown in FIG. 5, operator 1120 includes lookup table 402. Lookup table 402 receives signals PERFLOW and n as inputs. Lookup table 402 is three-dimensional with independent variables corresponding to engine speed (n) and percent flow (PERFLOW). The dependent output of table 402 is signal THRTLCMD representing desired throttle plate position. Signal THRTLCMD may optionally be restricted to a range of values by upper limit 410 and lower limit 412. Signal THRTLCMD is also input to lookup table 420. Lookup table 420 is a two-dimensional table with one independent variable corresponding to throttle plate position and one dependant output which is signal TVEA representing the throttle valve effective area command. Signal TVEA is output to air mass flow computation operator 1135 as described below in connection with FIG. 10. Signal THRTLCMD is output to throttle plate position control operator 1130 of FIG. 3B, an implementation of which is now described.

Figure 6:
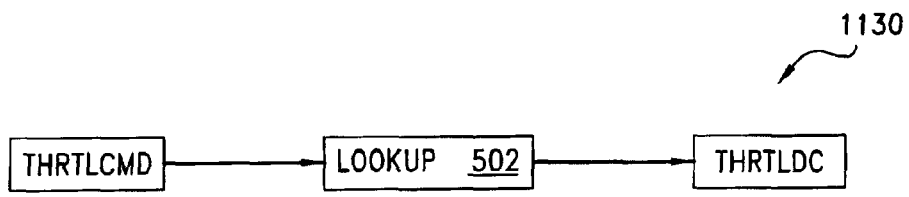

FIG. 6 shows operator 1130 of FIG. 3B in greater detail. As shown in FIG. 6, signal THRTLCMD is input to lookup table 502. Lookup table 502 is a two-dimensional table with one independent variable corresponding to throttle plate position and one dependent output which is signal THRTLDC representing the throttle percent duty cycle command. As illustrated in FIG. 2, a driver for a throttle actuator is responsive to signal THRTLDC to selectively actuate throttle valve 44.

Referring back to FIGS. 3A and 3B, analog input signal management operator 1060 provides signals MAP, IMT, GMF, L (shown as EGO in FIGS. 1 and 2), INLET, and OUTLET representing manifold absolute pressure, intake manifold temperature, gas mass flow, lambda, fuel inlet pressure, and fuel outlet pressure. The various signals are as measured by engine sensors discussed in connection with FIG. 1. These signals are provided as inputs to various operators discussed in more detail hereinafter.

Active lambda control operator 1070 outputs signal ALADJ representing active lambda adjustment to desired lambda computation operator 1080. Operator 1070 receives as inputs signal IRSS, MAP, ESCF (Engine Speed Control Flag), and nERR. Operator 1080 outputs signal DL representing desired lambda. Operator 1080 receives as inputs signals ALADJ, n, and MAP. Lambda control operator 1090 outputs signal CDL representing compensated desired lambda. Operator 1090 receives as inputs DL, L, and MAP. An implementation of operations 1070, 1080, and 1090 is more fully described now in connection with FIGS. 7, 8, and 9.

Figure 7:
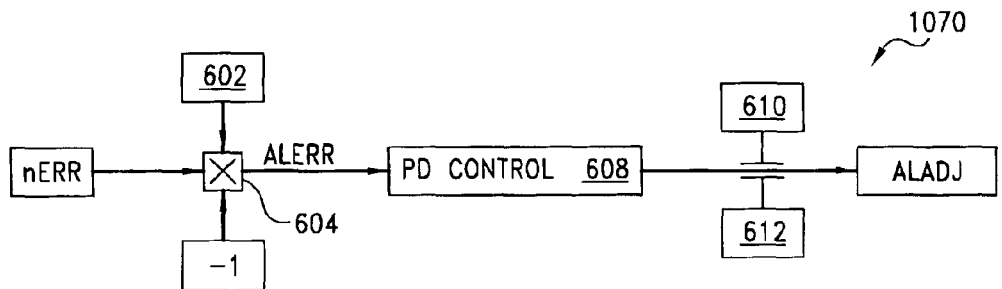

Referring to FIG. 7, operator 1070 of FIG. 3B is further described. Signal nERR is multiplied by closed loop gain input 602 with multiplier 604. Closed loop gain input 602 is an active lambda engine speed control closed loop gain that can be a fixed preset value (for example, preprogrammed into firmware, not shown), a modifiable value (for example, a value stored in an EPROM, not shown) or can be calculated based on various other operational characteristics (for example, the output of a lookup table, not shown), just to name a few possibilities. The output of multiplier 604 is signal ALERR representing active lambda control engine speed error. Signal ALERR is input to proportional-derivative (PD) control 608 which outputs signal ALADJ representing active lambda adjustment. Internally, PD control 608 may implement lookup tables (not shown) for determining control gains, filter time constants, or upper and lower limits used in the PD computation, with various PD operational parameters being determined as a function of MAP, ESCF, and IRSS.

In one example, PD control 608 could internally implement two-dimensional lookup tables with an independent variable corresponding to manifold absolute pressure. Such tables could have dependent outputs representing proportional gain, derivative gain, derivative low pass filter time constant, closed loop upper limit, and closed loop lower limit. Other methods as known in the art for implementing PD controls could alternately be used. Additionally or alternately, PD control 608 may also be implemented so as to account for whether the engine is operating at rated or idle status (for example, receiving as input, signal IRSS), and adjust control gains, filter constants, and limits accordingly.

Still referring to FIG. 7, upper limit 610 and lower limit 612 may optionally be included to restrict signal ALADJ to a range of values. Signal ALADJ representing active lambda adjustment is output to operator 1080 of FIG. 3B, selected functions of which are now described in connection with FIG. 8.

Figure 8:
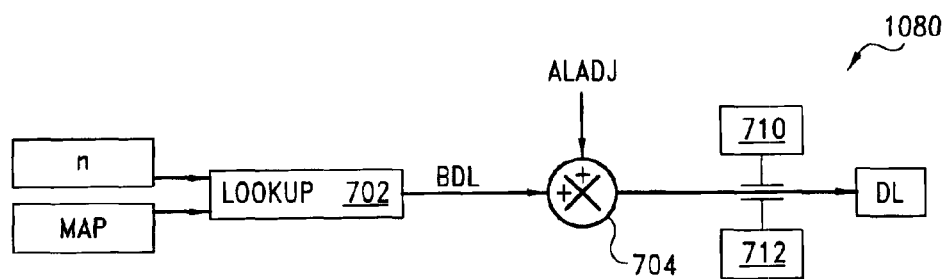

Referring to FIG. 8, operator 1080 of FIG. 3B is further described. Signals n and MAP are input to look-up table 702. Table 702 is a three dimensional table with independent variables corresponding to engine speed (n) and manifold absolute pressure (MAP). The dependent output of table 702 is converted to signal BDL representing base desired lambda. Signals ALADJ (of FIG. 7) and BDL are summed by adder 704 which outputs signal DL representing desired lambda. Upper limit 710 and lower limit 712 may optionally be included to restrict signal DL to a range of values. Signal DL is output to operator 1090 and operator 1135 of FIG. 3B. Selected functions of operator 1090 are now described in connection with FIG. 9.

Figure 9:
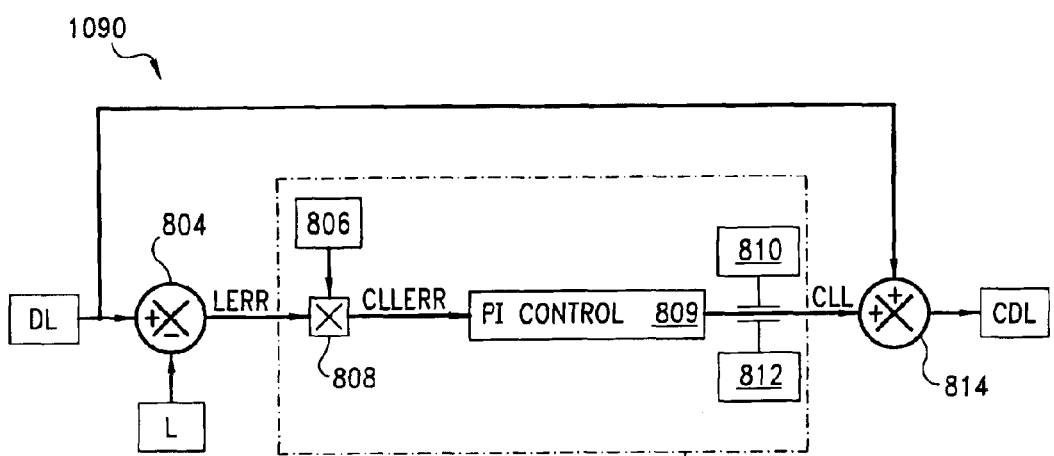

Referring to FIG. 9, operator 1090 of FIG. 3B is further described. Signal L is subtracted from signal DL (of FIG. 8) by adder 804 which provides signal LERR representing lambda error. Signal LERR is provided to operational block 805 which generates lambda closed loop compensation. Operational block 805 may be implemented to be active or inactive depending on the value of signal MAP. For example, if signal MAP is greater than a threshold value (which may be preset or calculated from other parameters) operational block 805 is inactive, and signal LERR is zeroed and passed to adder 814. Additionally, a hysteresis value can be used to determine the active state of operational block 805 to prevent active/inactive oscillation if the engine is operating near the threshold value. For example, until signal MAP is less than the threshold value minus a hysteresis value (which may be preset or calculated from other parameters), operational block 805 remains inactive.

When operational block 805 is active, signal LERR is multiplied with lambda closed loop gain input 806 by multiplier 808 to generate signal CLLERR representing closed loop lambda error. Signal CLLERR is input to PI control 809 which generates signal CLL representing closed loop lambda compensation. Signal CLL may optionally be restricted to a range of values by upper and lower limits 810 and 812, respectively. Signal CLL is summed with signal DL by adder 814 to generate signal CDL representing compensated desired lambda. Signal CDL is provided for input to operator 1100 of FIG. 3B.

Referring back to FIG. 3B, signal CDL is input to desired gas mass flow computation operator 1100 which outputs signal GMFC representing a gas mass flow command. Operator 1100 receives as inputs signal CDL and signal AMF representing air mass flow. Signal AMF is provided by operator 1135 as described below. Gas mass flow control operator 1110 outputs signal FCVDC representing fuel control valve percent duty cycle command. Operator 1110 receives as inputs signals GMFC, GMF, OUTLET, and INLET. An implementation of operators 1100, 1135, and 1110 is described more fully now in connection with FIGS. 10 and 11.

Figure 10:
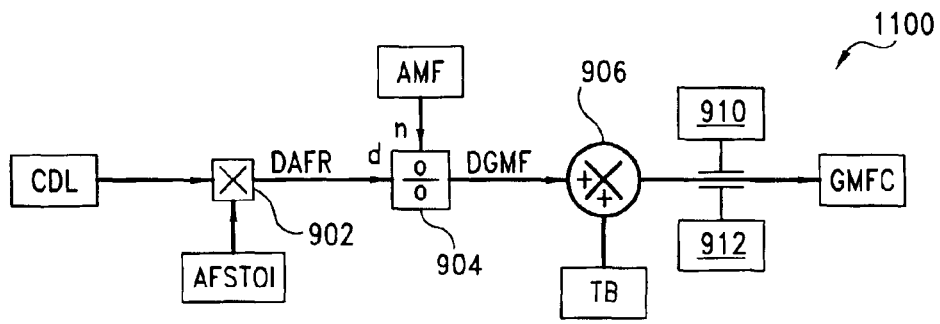

Referring now to FIG. 10, an implementation of desired gas mass flow computation operator 1100 of FIG. 3B is shown. Signal CDL (of FIG. 9) is multiplied with variable AFSTOI, which represents stoichiometric air/fuel ratio, by multiplier 902. Multiplier 902 outputs signal DAFR representing desired air/fuel ratio. Signal DAFR is divided into signal AMF, representing air mass flow, by divider 904 which outputs signal DGMF representing desired gas mass flow. Signal AMF is provided by operator 1135 of FIG. 3B.

Figure 11:
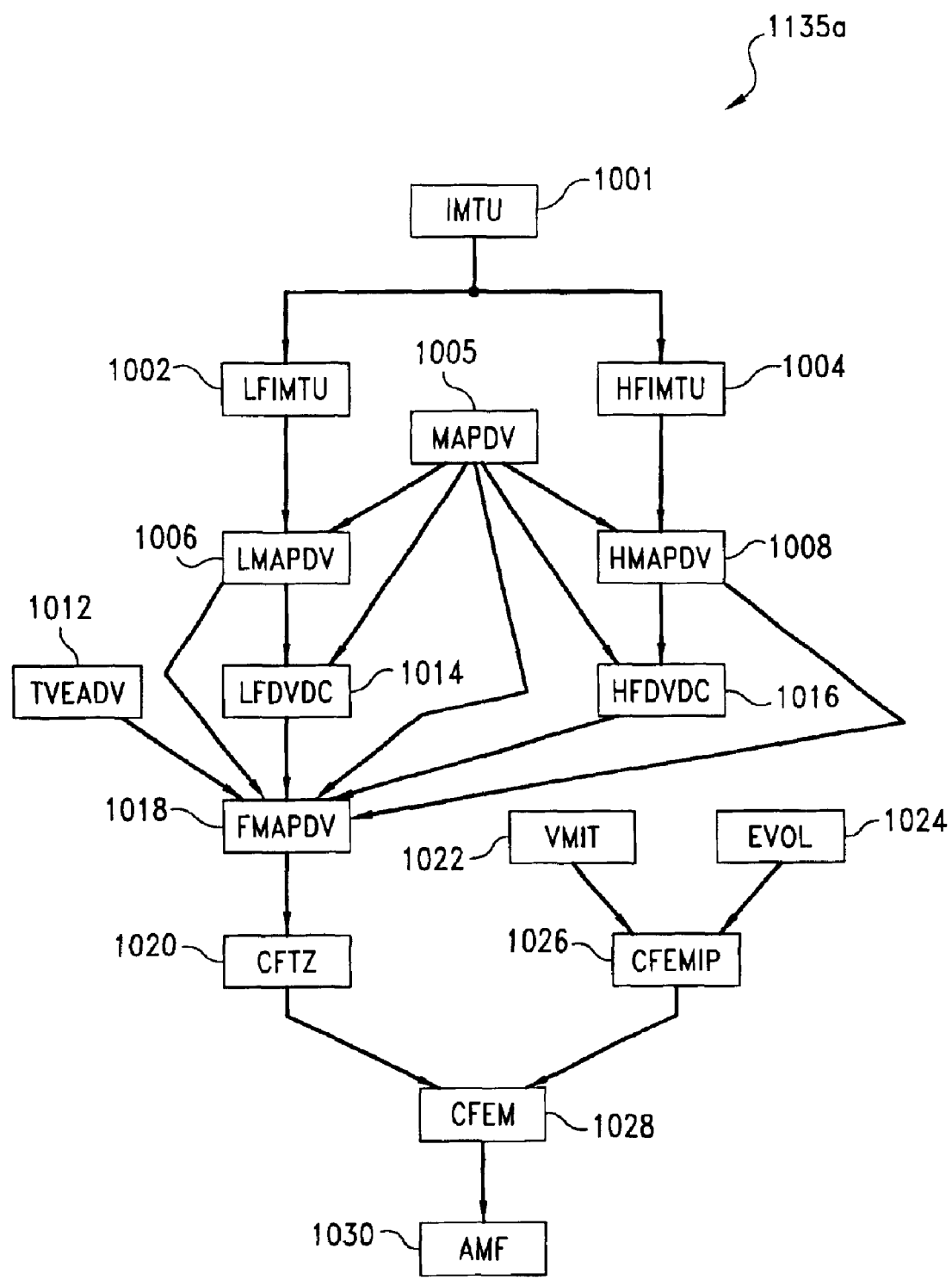

Referring to FIG. 11, the routine 1135a performed with operator 1135 of FIG. 3B is shown in greater detail. In stage 1001 of routine 1135a, variable IMTU, representing intake manifold pressure time constant is calculated as follows:

$$IMTU = 120 \times IMVOL/(VOLEF \times ENGDIS \times n)$$

where: IMVOL=volumetric displacement of the intake manifold;

VOLEF=volumetric efficiency of the given engine;

ENGDIS=volumetric displacement of the given engine; and n=engine speed.

Independent variable n (engine speed) may be determined by the corresponding engine sensor 52 as discussed in connection with FIG. 1. Variable IMTU is used in stages 1002 and 1004. In stage 1002, variable LFIMTU representing a manifold absolute pressure derivative light filter time constant is calculated by multiplying IMTU by an intake manifold pressure time constant multiplier for a manifold absolute pressure derivative light filter. In stage 1004, variable HFIMTU representing a manifold absolute pressure derivative heavy filter time constant is calculated by multiplying IMTU by an intake manifold pressure time constant multiplier for a manifold absolute pressure derivative heavy filter. LFIMTU and HFIMTU are used in stages 1006 and 1008 respectively to filter signal MAPDV which is generated in stage 1005.

Stage 1005 calculates MAPDV representing the manifold absolute pressure derivative through a difference equation approximation as follows:

$$MAPDV = (MAP(k) - MAP(k-1))/T$$

where: MAP=manifold absolute pressure;

k is the current sampling interval; and

T is the time difference between sampling intervals.

Independent variable MAP may be determined with a corresponding engine sensor 58 as discussed in connection with FIG. 1.

In stages 1006 and 1008, light filter LFIMTU and heavy filter HFIMTU are respectively applied to MAPDV to generate signals LMAPDV and HMAPDV representing respectively lightly and heavily filtered manifold absolute pressure derivative with respect to time. LMAPDV and IMAPDV are used in stages 1014 and 1016 respectively.

In stage 1014, variable LFDVDC is calculated by subtracting the lightly filtered signal LMAPDV from signal MAPDV. In stage 1016 HFDVDC is calculated by subtracting heavily filtered signal HMAPDV from lightly filtered signal LMAPDV. Variables LFDVDC and HFDVDC are used in stage 1018.

In stage 1012, variable TVEADV, which is also used in stage 1018, is calculated. TVEADV represents a discretely filtered throttle valve effective area command derivative with respect to time as is calculated as follows:

$$TVEADV = ABS((FTVEA(k) - FTVEA(k-1))/T)$$

where: FTVEA is the filtered throttle valve effective area;

k is the current sampling interval;

T is the time difference between sampling intervals; and

ABS( ) returns the absolute value of the argument in the parentheses "( )".

The filtered throttle valve effective area FTVEA is obtained by filtering the throttle valve effective area command TVEA as calculated in the charge flow process control discussed below.

In stage 1018, variable FMAPDV, representing a final manifold absolute pressure derivative with respect to time is determined as a function of MAPDV, LMAPDV, IMAPDV, LFDVDC, HFDVDC, and TVEADV. FMAPDV is used in stage 1020. In stage 1020, variable CFTZ representing the difference between transient charge mass flow and steady state charge mass flow estimated at the throttle valve is calculated as follows:

$$CFTZ = (18307.1232 \times IMVOL \times FMAPDV)/(CMGSCS \times IMTABS);$$

where: IMVOL=intake manifold volumetric displacement;

FMAPDV=final time derivative manifold absolute pressure;

CMGSCS=charge mixture gas constant;

IMTABS=(IMT+459.67); and

IMT=intake manifold temperature.

Independent variable FMAPDV is obtained from stage 1018. Independent variable IMT may be obtained from the corresponding engine sensor 54. Variable CFTZ is used in stage 1028.

In stage 1022, variable VIMT representing intake manifold temperature based volumetric efficiency adjustment is obtained from a lookup table (not shown) having as its single input signal IMT. The lookup table has one independent variable corresponding to IMT, and one output corresponding to an intake manifold temperature based volumetric efficiency adjustment. Variable VIMT is multiplied by variable EVOL obtained in stage 1024.

In stage 1024 variable EVOL representing base volumetric efficiency is obtained from a lookup table (not shown) having as its two inputs, signal n and MAP, corresponding to the table's independent variables representing engine speed and manifold absolute pressure. The lookup table has one output corresponding to base volumetric efficiency. Variables EVOL and VIMT are multiplied by a multiplier (not shown) which outputs signal VOLEF representing temperature-adjusted volumetric efficiency. Variable VOLEF is used in stage 1026.

In stage 1026, variable CFEMIP representing charge mass flow estimated at the engine intake ports is calculated as follows:

$$CFEMIP=(4.982552 \times DSRT \times VOLEF \times MAP)/(CFGSCS \times IMTABS)$$

where: DSRT=engine displacement rate;
VOLEF=volumetric efficiency;
MAP=manifold absolute pressure;
CFGSCS=charge mixture gas constant; and
IMTABS=IMT+459.67.

Independent variables MAP and IMT may be determined with engine sensors 58 and 54, respectively, as previously discussed. Also, independent variables VOLEF and CFGSCS may be determined from the same-named variables as calculated in stages discussed above. Variable CFEMIP is used in stage 1028.

In stage 1028, variable CFEM representing charge mass flow estimated at the mixing point is calculated as follows:

$$CFEM=CFEMIP+FCTZ$$

where: CFEMIP=charge mass flow estimated at the engine intake ports; and
CFTZ=the difference between transient charge mass flow and steady state charge mass flow estimated at the throttle valve.

Notably independent variables CFEMIP and CFTZ may be determined from the same-named variables calculated in stages 1026 and 1020 respectively as discussed above. Variable CFEM is used in stage 1030.

In stage 1030, variable AMF representing air mass flow estimated at the mixing point is calculated by subtracting signal GMF from variable CFEM obtained in stage 1028. Variable AMF is used to obtain signal DGMF for operator 1100 of FIG. 10.

Referring back to FIG. 10, signal DGMF is summed with signal TB representing a torque over boost based adjustment by adder 906 which outputs signal GMFC representing gas mass flow command. Optional upper limit 910 and lower limit 912 imposed on signal GMFC are also illustrated. Signal TB is an adjustment calculated to control emissions for a constant NOx at all loads. Commonly owned U.S. Pat. No. 5,949,146 provides further detail concerning this type of regulation and is hereby incorporated by reference in its entirety. Signal TB may be generated by subtracting a measured torque over boost value with a desired torque over boost value. Desired torque over boost may be calculated from various other parameters. For example, a base torque over boost adjustment could be multiplied by a spark timing adjustment to generate a desired torque over boost adjustment. A base torque over boost adjustment could be calculated from engine speed and manifold absolute pressure; for example using a three-dimensional lookup table having signals n and MAP as inputs. Spark timing adjustment could be calculated from a spark timing advance signal as generated by operator 1160 of FIG. 3B.

Signal GMFC is output to operator 1110 of FIG. 3B. Operator 1110 generates signal FCVDC representing fuel control valve duty cycle. Signal FCVDC is generated from signal GMFC and measured values for gas mass flow, fuel inlet pressure, and fuel outlet pressure. Signal FCVDC controls actuator 37, which in turn controls fuel control valve 36 of FIGS. 1 and 2.

Referring back to FIGS. 3A and 3B, engine speed control computation operator 1140 outputs signal ESCF and nERR respectively representing engine speed control flag and engine speed error. Operator 1140 receives as inputs signal ABS, DESn, n, and MAP. Signal ESCF represents engine speed control flag which is used to indicate whether certain active engine adjustments are to be made. In particular, signal ESCF is input to active lambda control operator 1070 (described in connection with FIG. 7) and is also input to active spark timing control operator 1150, now described.

Referring back to FIG. 3B, active spark timing control operator 1150 outputs to operator 1160 signal ASTADJ representing active spark timing adjustment. Operator 1150 receives as inputs signals IRSS, MAP, nERR and ESCF. Spark timing control operator 1160 outputs signal DST representing desired spark timing command. Operator 1160 receives as inputs signals ASTADJ, MAP, n, and IMT. Ignition system control operator 1170 outputs signals SRC and STC respectively representing a spark reference command and a spark timing command.

Figure 12:
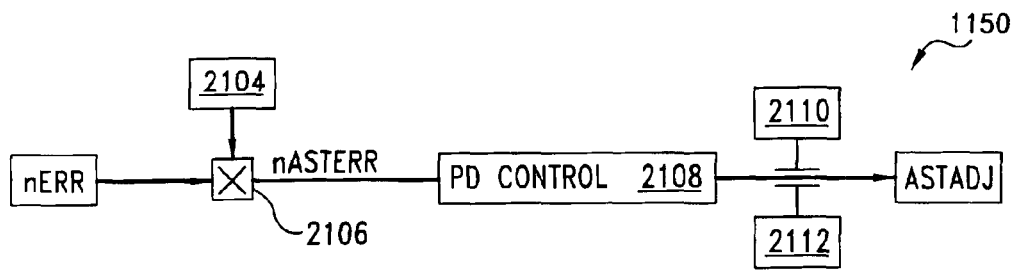

Referring additionally to FIG. 12, active spark timing control operator 1150 of FIG. 3B is described in greater detail. As shown in FIG. 12, signal nERR is multiplied with closed loop gain input 2104 by multiplier 2106. Closed loop gain input 2104 is an active spark timing control closed loop gain. The output of multiplier 2106 is signal nASTERR representing active spark timing control engine speed error. Signal nASTERR is input to Proportional-Derivative (PD) control 2108 which outputs signal ASTADJ representing active spark timing adjustment. Internally, PD control 2108 may implement lookup tables (not shown) for determining control gains, filter time constants, or upper and lower limits used in the PD computation. PD control 2108 parameters are determined as a function of IRSS and MAP.

In one example, PD control 2108 could internally implement two dimensional lookup tables with an independent (input) variable corresponding to manifold absolute pressure. Such tables could have dependant outputs representing proportional gain, derivative gain, derivative low pass filter time constant, closed loop upper limit, and closed loop lower limit. Other methods as known in the art for implementing PD controls could additionally or alternately be used.

Still referring to FIG. 12, upper limit 2110 and lower limit 2112 may optionally be included to restrict signal ASTADJ to a range of values. In one embodiment, optional logic (not shown) can be used to set signal ASTADJ to a static value if active spark timing is disabled and engine speed control flag ESCF is false. Signal ASTADJ is provided as an input to operator 1160 of FIGS. 3B and 13.

Figure 13:
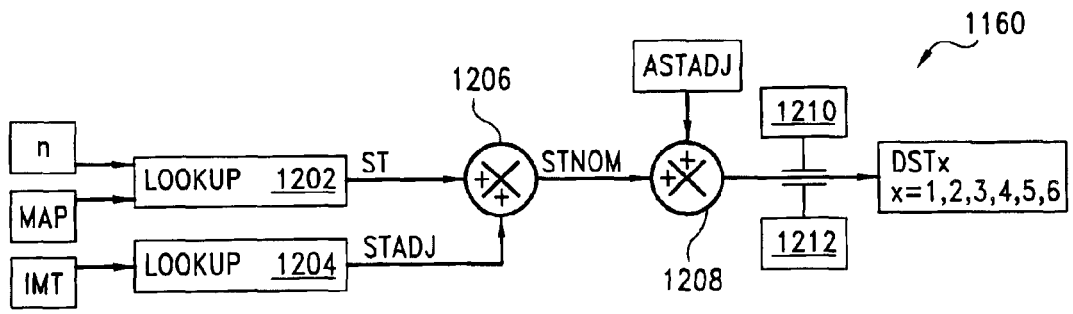

Referring to FIG. 13, operator 1160 is further described. Operator 1160 provides spark timing control signal DST to ignition system control operator 1170. Operator 1160 includes lookup table 1202. Lookup table 1202 is a three-dimensional lookup table having input signals n and MAP corresponding to independent input variables of engine speed and manifold absolute pressure, respectively. Table 1202 has output signal ST corresponding to base spark timing. Lookup table 1204 is a two-dimensional lookup table having input signal IMT corresponding to independent variable intake manifold temperature. Table 1204 has output signal STADJ corresponding to a spark timing command based on intake manifold temperature. Signals ST and STADJ are summed by adder 1206 which outputs signal STNOM corresponding to a nominal spark timing command for all cylinders.

Nominal spark timing command signal STNOM is summed with active spark timing command signal ASTADJ (as described in connection with FIG. 12) by adder 1208, which outputs signal DST corresponding to a desired spark timing command for all cylinders C1–C6. Signal DST is limited as necessary by spark timing upper limit 1210 and spark timing lower limit 1212. Signal DST is passed to operator 1170 of FIG. 3B as DSTx, corresponding to desired spark timing for a particular cylinder "x"; where x is an integer representing a particular cylinder C1–C6 (x=1, 2, 3, 4, 5, or 6). The ignition system control operator 1170 of FIG. 3B transmits signals SRC and STC in response to signal DSTx. As shown in FIG. 2, module 80c responds to signals SRC and STC to adjust timing of devices S1–S6.

In one mode of operating system 10, generator 90 is of a stand-alone configuration. For such a configuration, changes in electrical load on generator 90 can result in a different mechanical load on engine 60. For conventional systems, this change in load can result in a change in engine speed n and correspondingly change the frequency of alternating current (AC) being provided by generator 90. Typically, changes in the AC frequency of electric power provided with generator 90 are undesirable.

When operating system 10 in accordance with procedure 1000, engine speed changes and correspondingly electric power frequency changes are reduced. For example, procedure 1000 is arranged so that the active spark timing feature of system 10 adjusts the base spark timing command for all engine cylinders C1–C6 with devices S1–S6 via an offset. This offset is provided by the limited authority PD control 2108 of operator 1150, which closes the loop on engine speed. When the desired engine speed DESn is greater than the measured engine speed n, the control law of PD control 2108 behaves in such a way that the base spark timing command to cylinders C1–C6 is advanced from nominal. This advanced spark timing typically produces an increase in engine thermal efficiency, resulting in a corresponding increase in engine torque, which causes an increase in engine speed for a fixed engine load. When the desired engine speed DESn is less than the measured engine speed n, the control law of PD control 2108 causes the base spark timing of cylinders C1–C6 to be retarded relative to nominal. This retarded spark timing typically produces a decrease in engine thermal efficiency, resulting in a corresponding decrease in engine torque, which causes a decrease in engine speed for a fixed engine load.

In one nonlimiting example for a 6 cylinder engine running at 1800 revolutions per minute (RPM), this spark timing adjustment to regulate engine speed n adjusts on generally a cylinder-by-cylinder basis, such that once a speed deviation is detected, speed compensation can often begin with ignition timing adjustment for the next cylinder to fire.

Procedure 1000 also provides engine speed regulation through actively adjusting the air-to-fuel ratio (lambda) of the fuel charge provided to engine 60 for combustion. Initially procedure 1000 provides a base lambda from a lookup table as a function of the engine operating point. When the desired engine speed DESn is greater than the measured engine speed n, the base desired lambda DL of operator 1080 is reduced from nominal by signal ALADJ from operator 1070. This reduction in signal DL results in a richer fuel charge that causes engine speed to increase for a fixed engine load. When the desired engine speed DESn is less than the measured engine speed n, the base desired lambda DL is increased from nominal, resulting in a leaner fuel charge, causing engine speed to decrease for fixed engine load. Accordingly, with procedure 1000, engine speed n can be regulated by modulating lambda.

To further enhance engine speed regulation in general, and to address unwanted engine speed transients, throttle valve actuating speed governor gain multipliers are implemented to achieve a compromise between the small gains generally desired for acceptable steady state engine performance and large gains generally desired to address large, instantaneous engine load disturbances. A separate gain multiplier for each of three operating point dependent governor gains-proportional (P), integral (I), and filtered derivative (D) are implemented with operator 1050. In one implementation, the gain used in the respective P, I or D branch of operator 1050 is the operating point dependent gain multiplied by the gain multiplier input. The gain multiplier input is implemented as a 3-D lookup table with engine speed error nERR and manifold absolute pressure (MAP) as independent lookup input variables. The speed error nERR input to the table can be positive, zero, or negative to allow for different magnitudes and shapes of the gain multiplier as a function of engine speed error. Dependence on the MAP signal permits gain multiplication shaping as a function of engine load.

Procedure 1000 also provides operator 1135 to estimate transient air flow at the inlet of the air/fuel mixer on the basis of a filling/emptying model of the intake manifold 65. It has been found that this model provides an estimate of throttle valve charge mass flow which in turn has been found to be generally representative of the charge mass flow at the inlet of compressor 42. Subtracting the gaseous fuel mass flow entering mixer 40 from this estimate provides an estimate of the air mass flow at the inlet of the mixer (AMF).

The ignition timing advancement/retardation, active lambda adjustment, speed governor adjustment, and air mass flow estimation techniques of the present invention not only provide effective engine speed control together, but can be used individually or in combinations of two or more in other embodiments.

Furthermore, the teachings of the present invention relating to ignition timing or "start of combustion" could be utilized with many spark-based ignition and/or non-spark ignition techniques. In one example, spark ignition is provided by a spark ignition device in the combustion chamber. In another example, there is a prechamber in communication with each main combustion chamber, and each prechamber is provided a fuel/air charge that is relatively rich compared to a fuel/air charge in the main chamber. A spark ignition device in each prechamber is selectively activated to ignite this relatively rich charge and initiate combustion in the corresponding main chamber.

One example of a non-spark technique is micropilot injection ignition; where combustion is timed in relation to the injection of a small quantity of a fuel, such as diesel, kerosene, dimethylether, and/or a different type as would occur to one skilled in the art. For another non-spark technique, a diesel pilot is used to ignite gaseous fuel that is direct injected into the combustion chamber with air or a fuel/air charge provided from the intake manifold. Still another non-spark technique is compression ignition. In further embodiments, non-spark techniques and/or spark techniques can be used alone or in combination to vary ignition timing in accordance with the teachings of the present invention as would occur to one skilled in the art. Alternatively or additionally, when a gaseous fuel is used, it should be understood that it can be of any type, such as natural gas, propane, and/or petroleum gas, just to name a few.

In one further embodiment, it has been found that the sudden loss of electrical load often causes an engine overspeed condition possibly resulting in a shut-down. Similarly, when a significant load reduction occurs, compressor surge can result, which is frequently undesirable. By sensing or otherwise determining a drastic load loss of 30% or more with system 10, a high degree of ignition timing retardation can be rapidly initiated in response via procedure 1000 to prevent an overspeed condition and/or compressor surge.

It should be appreciated that many different embodiments of the present invention are envisioned. For example, another embodiment is directed to a method, comprising: operating an engine including at least one combustion chamber; providing a source of gaseous fuel; mixing gaseous fuel and air upstream of the at least one combustion chamber to provide a mixture of fuel and air to the engine for combustion; and adjusting a ratio of fuel to air in the mixture to maintain a generally constant rotational speed of the engine. A system to accomplish this method is also envisioned.

Yet a further embodiment includes: operating an engine; driving an electric power generator with the engine; and regulating engine speed with a PID controller including a number of potentially different gain multipliers each determined as a function of manifold absolute pressure and/or speed error. In one form, the different gain multipliers each correspond to a different element of the PID controller.

For a further embodiment, an engine is operated with an intake manifold that receives a mixture of gaseous fuel and air for combustion. The air mass flow to the manifold is estimated based on an emptying/filling model for the intake manifold and a sensed gaseous fuel mass flow rate into the mixture. The engine can be used to drive an electric power generator and the air mass flow estimation can be utilized to regulate engine speed to reduce transients in the frequency of AC electric power provided by the generator.

In another alternative embodiment, an engine is operated that drives an electric power generator. A unique spark ignition timing technique is utilized to advance and/or retard ignition timing in response to a change in engine speed to reduce changes in the frequency of AC electric power provided by the generator. In one form, the engine can be gaseous fueled and include a manifold to deliver an air/fuel charge for combustion by the engine. The ratio between air and fuel of the charge can be adjusted to further regulate engine speed for the reduction of AC electric power frequency changes. In another form, transient air mass flow is estimated based on an emptying/filling model of the manifold and/or a PID controller is used to further govern engine speed.

Still another embodiment includes operating an engine comprising a number of combustion chambers each corresponding to one of a number of spark ignition devices; determining a load loss of 30% or more; and retarding timing of the spark ignition devices to regulate operation of the engine. The engine can be used to drive an electric power generator, power a pump, or be mechanically linked to another load subject to rapid change and/or loss. In one form, ignition timing is also advanced and/or retarded to regulate rotational engine speed. In a further form, the engine can be gaseous fueled and include a manifold to deliver an air/fuel charge for combustion by the engine. The ratio between air and fuel of the charge can be adjusted to further regulate engine speed for the reduction of AC electric power frequency changes. In still a further form, transient air mass flow is estimated based on an emptying/filling model of the manifold and/or a PID controller is used to further govern engine speed.

It should also be appreciated, as used herein, that: variable, criterion, characteristic, quantity, amount, value, constant, flag, data, record, threshold, limit, output, matrix, command, and look-up table, each generally correspond to one or more signals within processing equipment of the present invention. It is contemplated that various functional blocks, operators, operations, stages, conditionals, procedures, thresholds, and processes described in connection with the present invention could be altered, rearranged, substituted, deleted, duplicated, combined, or added as would occur to those skilled in the art without departing from the spirit of the present invention.

All publications, patents, and patent applications cited in this specification are herein incorporated by reference as if each individual publication, patent, or patent application were specifically and individually to be incorporated by reference and set forth in its entirety herein. Any theory of operation described herein is merely intended to provide a better understanding of the present invention and should not be construed to limit the scope of the present invention as defined by the claims that follow or any stated theory or finding. While the invention has been illustrated and described in detail in the drawings and foregoing description the same is to be considered as illustrative and not restrictive in character, it being understood that only preferred forms have been shown and described and that all changes, modifications, and equivalents that come within the spirit of the invention as defined herein and by the following claims are desired to be protected.

What is claimed is:

1. A method for regulating an engine, comprising:
   providing an engine including one or more combustion chambers, an intake manifold, and a source of gaseous fuel;
   mixing the gaseous fuel and air upstream of the one or more combustion chambers to provide a mixture of air and fuel through the intake manifold to the engine for combustion, wherein the gaseous fuel includes one or more of natural gas, propane, or petroleum gas;
   driving an electric power generator with the engine, the generator being operable to provide AC electric power;
   adjusting a ratio between air and fuel in the mixture to regulate frequency of the AC electric power provided by the generator; and
   regulating rotational speed of the engine with a PID control based on a number of multiplies selected as a function of pressure in the intake manifold.

2. The method of claim 1 further comprising providing a fuel line to supply fuel to the engine, the fuel line including a controllable valve for regulating fuel flow therethrough, said adjusting the ratio comprising adjusting the controllable valve.

3. The method of claim 1 further comprising compensating for transient operation of the engine.

4. The method of claim 3 which includes providing a throttle configured to regulate flow of the mixture, said compensating for transient operation being performed in accordance with a throttle position.

5. The method of claim 1 wherein the engine includes one or more spark ignition devices in correspondence to the one or more combustion chambers, and which includes changing activation timing of the one or more spark ignition devices to maintain a desired rotational engine speed.

6. The method of claim 5 which includes retarding the activation timing of the one or more spark ignition devices in response to an engine load loss of 30% or more.

7. The method of claim 5 further comprising maintaining the desired rotational engine speed by adjusting a flow of the mixture.

8. The method of claim 7 further comprising:
providing a throttle configured to regulate flow of the mixture; and
changing position of the throttle to adjust the flow of the mixture.

9. A system for generating electric power, comprising:
An internal combustion engine including an intake manifold;
An electric power generator coupled to said engine to be driven therewith;
A first sensor to sense rotational speed of said engine and output a first signal corresponding thereto;
A second sensor to sense manifold pressure and output a second signal corresponding thereto;
A controller responsive to said first signal and said second signal to generate a valve control signal to regulate engine speed relative to a desired rotational engine speed in accordance with a number of gain multipliers each determined as a function of the rotational speed of said engine with the manifold pressure by adjusting a ratio of a mixture of fuel and air provided to said engine for combustion.

10. The system of claim 9 wherein said controllable valve is provided in a fuel line for supplying gaseous fuel, said controllable valve being operable to regulate fuel flow therethrough in response to said valve control signal.

11. The system of claim 9 further comprising a throttle configured to regulate flow of said mixture, said controller being operable to compensate for transient operation of said engine at least in accordance with throttle position.

12. The system of claim 9 wherein:
said engine includes one or more combustion chambers and a corresponding one or more spark ignition devices; and
said controller being further operable to regulate said engine relative to a desired rotational engine speed by adjustment of activation timing of said one or more spark ignition devices.

13. The system of claim 9 further comprising a throttle operable to adjust flow of said mixture.

14. A method, comprising:
operating an internal combustion engine including a manifold coupled to a number of combustion chambers;
providing a mixture of fuel and air to the combustion chambers through the manifold;
detecting a change in rotational speed of the engine;
adjusting the mixture from a first fuel-to-air ratio to a second fuel-to-air ratio in response to said detecting to regulate the rotational speed of the engine, which includes governing the rotational speed of the engine with a PID controller; and
driving an electric power generator with the engine during said adjusting.

15. The method of claim 14 which includes adjusting activation timing of a number of ignition devices each associated with a corresponding one of the combustion chambers.

16. The method of claim 15 which includes retarding timing of the ignition devices in response to an engine load loss of 30% or more.

17. The method of claim 14 wherein said adjusting includes changing a flow of fuel to a mixer with a controllable valve.

18. The method of claim 17 wherein the fuel is of a gaseous type.

19. The method of claim 14 which includes regulating the rotational speed of the engine in accordance with a sensed rotational engine speed and a manifold pressure.

20. The method of claim 14 wherein said regulating is further performed in accordance with intake manifold temperature and manifold pressure.

21. The method of claim 19 wherein said regulating includes estimating the air mass flow based on an emptying/filling model of the manifold.

22. The method of claim 14 which includes sensing exhaust gas oxygen and fuel mass flow.

23. The method of claim 14 which includes pressurizing the mixture provided to the manifold with a compressor driven by a turbine turned by exhaust from the engine.

24. A system comprising:
an internal combustion engine including a manifold to selectively supply a mixture of gaseous fuel and air to each of a number of combustion chambers, the combustion chambers each corresponding to one of a number of spark ignition devices;
means for pressurizing the mixture provided to the manifold with a compressor driven by a turbine turned by exhaust from the engine;
means for supplying the mixture to said manifold;
means for sensing rotational speed of said engine;
means for adjusting the mixture from a first fuel-to-air ratio to a second fuel-to-air ratio in response to said sensing means to regulate engine rotational speed; and
means for driving an electric power generator with said engine.

25. A method, comprising:
operating an internal combustion engine including a number of combustion chambers and a corresponding number of spark ignition devices;
pressurizing a mixture of fuel and air with a compressor, the compressor being driven with a turbine turned by exhaust from the engine;
providing the mixture to the combustion chambers of the engine;
driving an electric power generator with the engine;
detecting a sudden engine load loss of 30% or more; and
retarding timing of the spark ignition devices in response to the sudden engine load loss.

26. The method of claim 25, which includes regulating rotational engine speed during said driving to maintain a desired frequency of AC electrical power provided by the generator.

27. The method of claim 26, wherein said regulating is performed as a function of sensed rotational engine speed.

28. The method of claim 27, wherein said engine includes a manifold arranged to provide the mixture to the combustion chambers and said regulating is performed as a function of sensed temperature and pressure associated with the manifold.

29. A method, comprising:
providing an engine including one or more combustion chambers and a source of fuel;
mixing the fuel and air upstream of the one or more combustion chambers to provide a mixture of air and fuel to the engine for combustion;
driving an electric power generator with the engine, the generator being operable to provide AC electric power;
adjusting a ratio between air and fuel in the mixture to regulate frequency of the AC electric power provided by the generator; and
regulating rotational speed of the engine with a PID control based on a number of multipliers selected as a function of an engine manifold pressure.

30. The method of claim 27 further comprising compensating for transient operation of the engine.

31. The method of claim 29 wherein the engine includes one or more spark ignition devices in correspondence to the one or more combustion chambers, and which includes changing activation timing of the one or more spark ignition devices to maintain a desired rotational engine speed.

32. The method of claim 31 which includes retarding the activation timing of the one or more spark ignition devices in response to an engine load loss of 30% or more.

33. The method of claim 31 further comprising maintaining the desired rotational engine speed by adjusting a flow of the mixture.

34. A method, comprising:
operating an internal combustion engine including a manifold coupled to a number of combustion chambers;
providing a mixture of fuel and air to the combustion chambers through the manifold;
sensing exhaust gas oxygen and fuel mass flow;
detecting a change in rotational speed of the engine;
adjusting the mixture from a first fuel-to-air ratio to a second fuel-to-air ratio in response to said detecting to regulate the rotational speed of the engine; and
driving an electric power generator with the engine during said adjusting.

35. The method of claim 31 which includes:
adjusting activation timing of a number of ignition devices each associated with a corresponding one of the combustion chambers; and
retarding timing of the ignition devices in response to an engine load loss of 30% or more.

36. The method of claim 34 wherein said adjusting includes changing a flow of fuel to a mixer with a controllable valve, and the fuel is of a gaseous type including at least one of natural gas, propane, and petroleum gas.

37. The method of claim 34 which includes regulating the rotational speed of the engine in accordance with a sensed rotational engine speed and a manifold pressure.

38. The method of claim 37 wherein said regulating is further performed in accordance with intake manifold temperature and manifold pressure and includes estimating the air mass flow based on an emptying/filling model of the manifold.

39. The method of claim 34 which includes pressurizing the mixture provided to the manifold with a compressor driven by a turbine turned by exhaust from the engine.

40. A method, comprising:
operating an internal combustion engine including a manifold coupled to a number of combustion chambers;
providing a mixture of fuel and air to the combustion chambers through the manifold;
pressurizing the mixture provided to the manifold with a compressor driven by a turbine turned by exhaust from the engine;
detecting a change in rotational speed of the engine;
adjusting the mixture from a first fuel-to-air ratio to a second fuel-to-air ratio in response to said detecting to regulate the rotational speed of the engine; and
driving an electric power generator with the engine during said adjusting.

41. The method of claim 40 which includes:
adjusting activation timing of a number of ignition devices each associated with a corresponding one of the combustion chambers; and
retarding timing of the ignition devices in response to an engine load loss of 30% or more.

42. The method of claim 40 wherein said adjusting includes changing a flow of fuel to a mixer with a controllable valve, and the fuel is of a gaseous type including at least one of natural gas, propane, and petroleum gas.

43. The method of claim 40 which includes regulating the rotational speed of the engine in accordance with a sensed rotational engine speed and a manifold pressure.

44. The method of claim 43 wherein said regulating is further performed in accordance with intake manifold temperature and manifold pressure and includes estimating the air mass flow based on an emptying/filling model of the manifold.

* * * * *

UNITED STATES PATENT AND TRADEMARK OFFICE
CERTIFICATE OF CORRECTION

PATENT NO. : 6,876,097 B2
DATED : April 5, 2005
INVENTOR(S) : Thomas et al.

It is certified that error appears in the above-identified patent and that said Letters Patent is hereby corrected as shown below:

Column 14,
Line 64, replace "multiplies" with -- multipliers --.

Column 16,
Line 24, replace "14" with -- 19 --.

Column 17,
Line 48, replace "31" with -- 34 --.

Signed and Sealed this

Fourth Day of October, 2005

JON W. DUDAS
*Director of the United States Patent and Trademark Office*